United States Patent [19]
Blaskey et al.

[11] Patent Number: 5,606,344
[45] Date of Patent: Feb. 25, 1997

[54] INFORMATION DISPLAY APPARATUS

[75] Inventors: John D. Blaskey, Cheshire; David Cross, Andover, both of United Kingdom

[73] Assignee: Pinewood Associates Limited, Manchester, United Kingdom

[21] Appl. No.: 656,602

[22] Filed: May 31, 1996

Related U.S. Application Data

[63] Continuation of Ser. No. 221,008, Apr. 1, 1994, abandoned.

[30] Foreign Application Priority Data

Apr. 2, 1993 [GB] United Kingdom .................. 9307025
Feb. 11, 1994 [GB] United Kingdom .................. 9402662

[51] Int. Cl.$^6$ .................. G09G 5/00; G09B 7/00
[52] U.S. Cl. .................. 345/115; 345/169; 345/2; 345/123; 434/350; 348/734
[58] Field of Search ................... 345/123, 158, 345/168, 169, 903, 905, 1, 2, 901, 902, 146, 115; 348/734; 340/825.17; 434/350, 351, 307 R; 395/155, 161

[56] References Cited

U.S. PATENT DOCUMENTS

| | | |
|---|---|---|
| 3,907,419 | 9/1975 | Moran . |
| 4,660,107 | 4/1987 | Chippendale, Jr. . |
| 5,087,010 | 2/1992 | Walters . |
| 5,200,738 | 4/1993 | Fumoto et al. .......... 345/123 |
| 5,307,055 | 4/1994 | Baskin et al. .......... 345/1 |
| 5,339,391 | 8/1994 | Wroblewski et al. .......... 345/123 |
| 5,426,510 | 6/1995 | Meredith .......... 348/159 |
| 5,450,079 | 9/1995 | Dunaway .......... 345/169 |
| 5,535,422 | 7/1996 | Chiang et al. .......... 395/155 |

FOREIGN PATENT DOCUMENTS

| | | |
|---|---|---|
| 0403118 | 12/1990 | European Pat. Off. . |
| 2649816 | 1/1991 | France . |
| 3264992 | 11/1991 | Japan .......... 345/2 |
| 89/05023 | 6/1989 | WIPO . |

*Primary Examiner*—Richard Hjerpe
*Assistant Examiner*—Kara Farnandez Stoll
*Attorney, Agent, or Firm*—Larson & Taylor

[57] ABSTRACT

An information display apparatus, such as a lectern (6), is disclosed which is usable when giving a presentation or speech. The lectern includes a screen (2) for the display of text and a memory for the storage of text to be displayed. Also included is a controller (9) for controlling the text displayed on the screen in response to the operation of a keypad. The lectern includes a transmitter such as an infrared diode for the actuation of a further piece of apparatus such as a projector (54) or an audio system.

6 Claims, 3 Drawing Sheets

INFORMATION DISPLAY APPARATUS

This application is a continuation of application Ser. No. 08/221,008, filed Apr. 1, 1994, is now abandoned.

BACKGROUND OF THE INVENTION

1. Field of the Invention

The present invention relates to an information display apparatus and particularly, but not exclusively to a lectern.

2. Summary of the Prior Art

Traditionally a lectern is a stand or reading desk from which presentations or speeches are given. Usually the stand is used to support notes etc for the presentation. This has the problem that the presenter must be continually turning pages in order to keep track of the current position of the presentation in relation to the notes.

In the television field, autocue systems have been developed to provide a scrolling text which keeps pace with the presentation and shows the portion of the speech currently being given. Autocue systems are typically operated by someone other than the presenter. Since the systems were developed for television use they typically involve projecting the text to be displayed onto an angled screen in front of the camera. The angled screen is designed so that the presenter can see the text on the screen whilst at the same time the viewpath of the camera is not obstructed. Such autocue systems are clearly bulky complex and expensive.

It is also known to provide text on a traditional computer set up such as a word processor. Conceivably such a word processor could be used when giving a presentation or speech but, again, typical computer systems comprising a keyboard, hardware, and monitor are cumbersome and expensive.

SUMMARY OF THE INVENTION

The present invention aims to alleviate at least some of the above problems and to provide a more convenient information display system for use in presentations or speech-making etc.

At its most general the present invention is concerned with an information display apparatus including support means for supporting at a suitable height display means for presentation of text, storage means for storing text to be displayed, input means for inputting text to said text storage means, and control means for controlling text displayed on the display means.

Thus, when using the present invention, a presenter may prepare e.g. a speech or presentation and store the text of the speech in the storage means. The information display apparatus may then be set up where ever the speech or presentation is to be given and the text of the speech can be displayed on the display means, typically a small screen. The display of the text on the screen is controllable and, for example, the text may be advanced manually or scrolled as required, e.g. automatically at a predetermined speed or speeds. There is thus provided a simpler and easier to use text display/prompter for use in speech delivery.

Autocue systems are typically operated by someone other than the presenter. One advantage of the present invention is that it is user operated and thus fully controllable.

Within the general concept discussed above, the present invention has several aspects. Often, when a presentation or speech is given, external equipment needs to be controlled during the presentation or speech. For example, the person giving the presentation or speech may want to have slides or other images displayed to the audience during the course of the presentation or speech, and thus a projector or similar object needs to be controlled. Similarly, lighting may need to be controlled during the presentation or speech. In existing arrangements the control of such external equipment is either by the person giving the presentation or speech using a separate or manual control, or manually by a third party.

Therefore, in accordance with a first aspect of the present invention, operation commands for controlling the external equipment are stored in the storage means and are retrieved in conjunction with the control of the text presented on the display means. When the operation commands are retrieved, they are passed to a transmitter which transmits them as electromagnetic radiation to the or an appropriate external piece of equipment. Thus, the person giving the presentation or speech triggers appropriate external equipment as the speech is controlled on the display means. This has the advantage that the timing of that control can be synchronised with appropriate parts of the text without the person giving the speech having to operate a separate control.

In this first aspect, the operation commands are preferably input to the storage means at the same time as the input of the text, so that appropriate synchronisation can be achieved easily.

Thus, the text may include markers or flags to indicate when the external equipment should be actuated. Then, when the text including a flag is displayed, the actuation occurs automatically. Normally, the markers or flags may be positioned in the text by the person giving the presentation or speech when preparing the text to be displayed, but they may be inserted separately if desired.

As was mentioned above, the present invention includes control means for controlling the text displayed. The second aspect of the invention, which is independent but which may be used in conjunction with the first aspect, proposes that the control means is permanently connected to the support means which supports the display, but that the input means for inputting text is separable. With this aspect of the present invention, the input means may be used to input the text to the storage means and then detached from the support means. The display of the text may still be controlled by the control means and the control means may then be a relatively simple key pad, e.g. having scrolling keys for controlling the display and few, if any, other keys.

The advantage of this arrangement is that most keyboards for inputting text are relatively large, if they are to be convenient and easy to use. However, it is then inconvenient for that keyboard to be present when the speech or presentation is given. Therefore, with this second aspect of this invention, the keyboard may be removed after the text has been stored in the storage means so that the information display apparatus is as compact as possible when the presentation or speech is given being controllable using only the keypad.

In one embodiment of this second embodiment, the text of the speech is prepared beforehand on a word processing package, which possibly may be a dedicated word processing package for use with an information display apparatus according to the present invention. The text input means may then include interface means for transfer of the text to be displayed from such a word processor to the storage means. This allows the speech to be prepared e.g. in an office, and then to be transferred to the information display operation for convenient subsequent delivery. If the amount of text required to be stored is greater than the capacity of the storage means (which may be RAM memory), it may be re-connected to the storage means and further text be stored therein. This facilitates the transfer of text from the word processor to the storage means and allows a speech of greater length than would normally be stored in the storage means to be accessed. The text may also be stored on a portable computer or a personal organiser.

In an alternative embodiment of the second aspect, suitable word processing means (e.g. hardware and/or software) may be included in the information display operation, possibly as part of the text input means. Text could then be prepared using, for example, a suitable keyboard connected to the word processing means.

In the second aspect, the lectern may further include actuation means for actuation of an external object. The external object may, as in the first aspect, be some other type of apparatus which is used to aid the presentation of the speech, such as a slide projector, overhead projector, curtains, other type of screen, or audio system for sound effects etc.

The actuation means may be a solid link to such subsidiary information means but is preferably a remote link. Again, as in the first aspect, this may be provided by the inclusion of a transmitter such as an infra red transmitter suitably positioned on the information display apparatus.

The screen may be of any commonly available variety e.g. LED, LCD, TV monitor or vacuum fluorescent display (VFD), but preferably is a dot matrix screen. The screen may be of any size and display any number of lines of text but preferably displays about eight lines of text at a time.

The screen faces upwardly, and is preferably horizontal or at a small angle, e.g. less than 30° to the horizontal or at an angle to suit the speaker. The angle may be adjustable.

The present invention has been developed for providing an information display apparatus in the form of a lectern. When applied to the lectern, the present invention is not limited to the giving of traditional presentations to an audience. For example, a lectern according to the present invention may be used in other fields, such as telephone sales, training, conferences, seat backs, or market research or point-of-sale terminals. In such applications, a number of lecterns may be connectable to a common wordprocessor or controller, so that they receive the same text. Each user of the lectern may then control the text using the control means. Alternatively, the lectern may be arranged on or adjacent a television camera or other cameras, for example for the use of newsreaders, broadcasters, actors or other performers.

However, the present invention is not limited to lecterns. It may be used, for example, to provide information display for e.g. a museum in which text concerning an exhibit of the museum is stored in the storage means and then a visitor to the museum may control the display of that text in a way which is convenient for the particular visitor, rather than being fixed.

In such a situation, the first aspect of the present invention then permits the exhibit itself to be controlled by operation commands transmitted from the information display apparatus whilst the visitor controls the text on the display, so that the exhibit responds as the visitor controls the text. The second aspect of the present invention means that the keyboard or other means for inputting the text to the storage means may be removed from the information display apparatus, so that the visitor has only a limited number of controls and the information display apparatus can be kept small in size.

BRIEF DESCRIPTION OF THE DRAWINGS

Embodiments of the present invention will now be described in detail, by way of example, with reference to the accompanying drawings, in which.

DETAILED DESCRIPTION

An embodiment of the present invention will now be described, in which the information display apparatus is in the form of a lectern.

Figure 1:
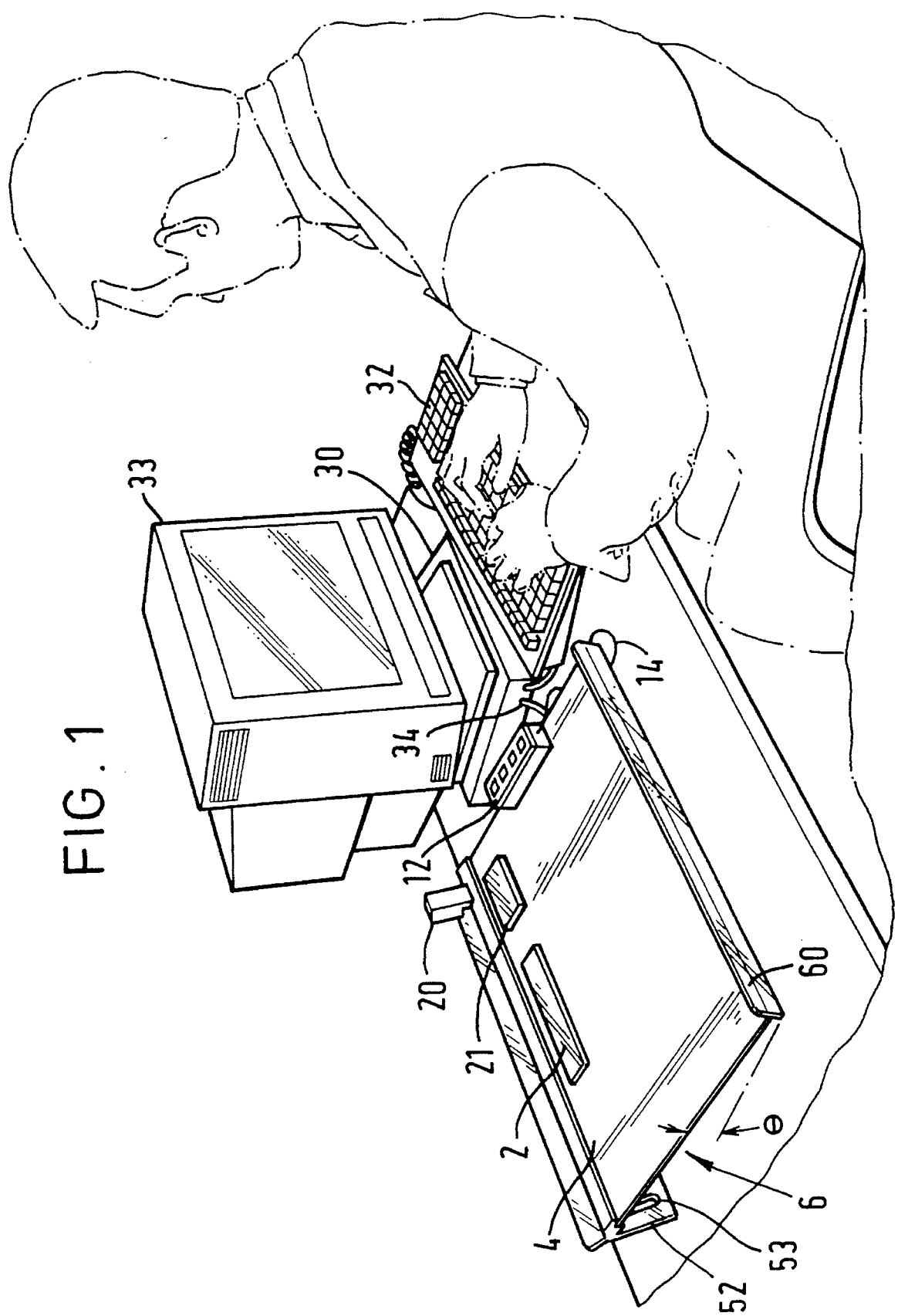
FIG. 1 shows a perspective view of an information display apparatus according to the present invention, connected for the input of text.
Figure 2:
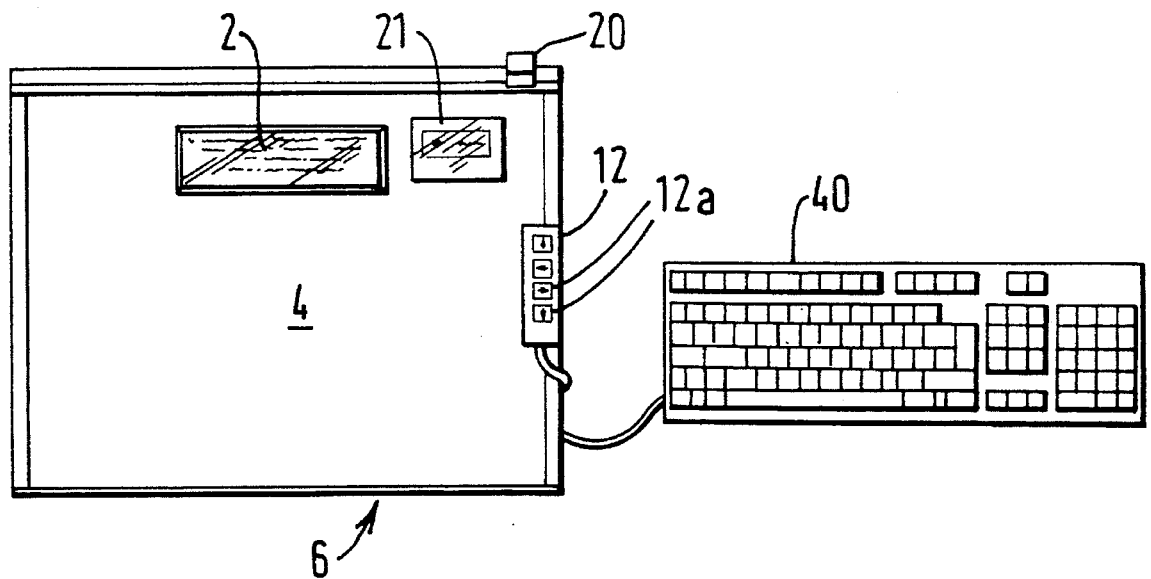
FIG. 2 shows a plan view of the information display apparatus of FIG. 1, but arranged for text to be inputted in a different way from that shown in FIG. 1.

FIGS. 1 and 2 show a screen 2, such as a VFD dot matrix screen, mounted in the top surface 4 of a panel of a lectern indicated generally at 6. The display on the screen 2 displays a maximum of eight lines by forty characters of the text to be viewed in a dot matrix format. The screen 2 may be of different size, e.g. 4 or possibly 24 lines as required. Additionally the screen 2 may include a variable brightness control to allow for modification according to the light level present in the room or area in which the presentation is being delivered. Also mounted in the lectern 6 is a housing 8 (see FIG. 3) in which is the controller 9 containing the control electronics for the lectern system.

The lectern may derive its power from the mains supply and is shown with a mains connection lead 10. The lectern may then also include a transformer and rectifier 11 to provide a 5 V DC supply for the display 2 and the controller 9. Alternatively, or additionally the lectern may include one or more batteries e.g. a rechargeable sealed lead acid battery pack, and be adapted to be battery-powered.

Where a mains power supply is to be used, provision may be made for the supply to be variable e.g. 110 volts AC or 240 volts AC. An "international" switch mode AC adapter may be used to provide for this. Also shown mounted on the right hand side (as seen in FIG. 2) of the panel 4 is a keypad 12 connected to the controller via lead 14. The keypad 12 is fixedly connected to the controller 9, but may be removably mounted e.g. with a clip, on the panel 4 so that it can be transferred to a different portion of the panel 4, for example to provide for right and/or left handed use. By using the keypad 12, a user may select a number of text display options, such as advancement through the text one line or one page at a time, reversal backwards through the text in a similar fashion, and/or automatic scroll through the text at one or more predetermined speeds. This allows the speaker to have precise control over the delivery of the presentation and, for example, to halt the presentation to answer questions etc.

The controller 9 e.g. a microprocessor, controls the storage of the text in a storage means, such as a memory 15, and the display of text on the screen 2. The screen 2 communicates with the controller 9 via e.g. a BIA/RS232 protocol using the ASCII code set. A serial connection is provided which operates at 9600 baud with 8 data bits, one start bit, one stop bit and no parity. A handshake line may also be provided along with a data-in and data-ground line for communication.

FIGS. 1 and 2 also show that the panel 4 supports a transmitter 20 which is connected to the controller 9. The transmitter 20 is preferably an infra-red transmitter and is used to transmit operation commands to an external object, as will be described in more detail later. Those operation commands are stored in the memory 15 in conjunction with the text to be displayed on the display 2, and control of the display 2 by the key pad causes those operation commands to be retrieved from the memory 15 by the controller 9 and passed to the transmitter 12 at a time which is synchronised with the display of an appropriate part of the text by the display 2. In this way, the operation of an external object can be synchronised with the presentation of the text by the user.

FIGS. 1 and 2 also show that the panel 4 may support a clock 21. The clock 21 may be operated entirely separately, in order to give a time display, but is preferably connected to the controller 9 as shown in FIG. 3 so that e.g. the presentation can be timed by the clock 21 without the user having to operate a separate control.

In order for the lectern 6 to operate in the way described above, text must be input thereto and stored in the memory 15. FIG. 1 illustrates one way of achieving this, by connecting the lectern 6 to a separate computer 30 via e.g. an interface 31 (see FIG. 3) connected to the controller 9. Then, as shown in FIG. 1 a speech or similar text is input to the computer via a keyboard 32 until the whole of the text has been stored in the computer 30. To facilitate such input of text, the computer has a screen 33, and indeed the computer 30, the keyboard 32 and the screen 33 may be a standard computer such as a PC. At the same time as inputting the text to the computer 30 via the key board 32, operation commands for controlling the transmitter 20 may be inputted so that the location of those commands within the text is synchronised with an appropriate part of the text.

Then, the text is transferred from the computer 30 via cable 34 and via the interface 31 and the controller 9 to the memory 15, and the computer 30 may then be detached from the interface 31. The lectern may subsequently be taken to the site at which the presentation is to be given. This means that the text may be prepared and input at e.g. the office of the user without the computer 30 having to be taken to the site at which the speech is to be given.

Figure 3:
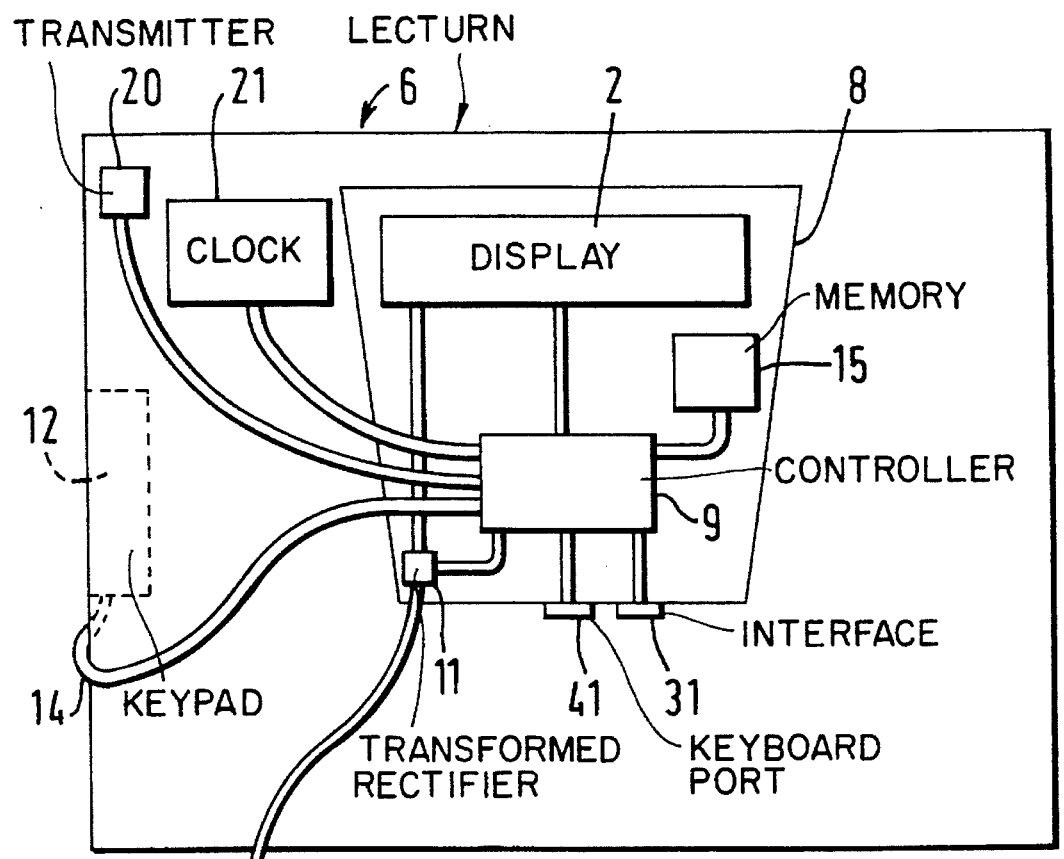
FIG. 3 shows a view from below of the information display apparatus of FIGS. 1 and 2.

Alternatively, as shown in FIG. 3, the lectern 6 is provided with a keyboard 40 which is a separate unit detachably connectable via a keyboard port 41 connected to the controller 9. The controller 9 then includes a word-processing program, to allow input and editing of text and data stored in the controller. The whole lectern is in this case self-sufficient and may for example be made portable e.g. in a single transport case including controller and screen as one unit, with built-in infra-red controller 20 and keypad 12, detachable keyboard 40 and battery pack (not shown). Text can be entered via the detachable keyboard 40, or from another data processor which may be remote. Text can be edited by the user, using the detachable keyboard 40, at any location. The keyboard 40 is detachable, since during the making of a speech it is not needed and its presence may be inconvenient.

This feature of on-board word processing capability thus permits "portable" text entry, i.e. allows a user to input and amend text without requiring the use of the external computer 30 shown in FIG. 1. The presentation is subsequently stored in the memory section of the lectern, possibly using a "flash" loading device. The word processing means may include a facility to store and use the character sets of different languages.

As mentioned above, during the making of a speech, the user employs the small keypad 12 to control at least the display of text on the screen 2. The keypad 12 is mounted or mountable at a convenient position on the lectern 6 to be operated by one hand of the user. Preferably the keypad 12 has a minimal number of keys 12a (see FIG. 2), e.g. less than 10, and most preferably four, so that it can be easily operated by feel, rather than requiring the reader to use his or her eyes to select its keys 12a. The keys 12a of the keypad 12 are of a type which gives the user's fingers a clear indication that actuation has occurred, so that the user has confidence that he or she has operated a key 12a.

Where as few as four keys 12a only are provided on the keypad 12, the controller may be programmed so that the keys provide different functions when pressed singly and in combinations. For example, the four keys when pressed alone may respectively cause "LINE UP", "LINE DOWN", "PAGE UP" and "PAGE DOWN" of the text on the screen 2. Pressing a selected pair of keys together may for example cause the text on the screen 2 to scroll at a pre-selected speed, with a single key on the keypad 12 thereafter pausing the scrolling.

When the lectern 6 is to be connected to a computer 30, it may incorporate an interface board for the purpose of allowing down-loading of text from the computer 30. The interface board may include a 2-way power connector and a 6-way "BT-style" telephone socket. The serial connector carries the incoming serial data from the word processor and can be used to communicate with the controller. The connector may be prevented from mounting with any official BT connection by way of its design holding. Additionally the connector may carry a secondary pair of DC power lines.

The interface board may also include a 26-way IDC to PCB female connector and at least one RS232TTL inverter/limiter channel for the RS232 information. Additionally the board may accommodate some over-voltage and reverse voltage protection components for both display supply and data channel purposes.

The interface may permit both downloading of text into the memory and connection to a word processor so that the word processor can be used to transfer text to the lectern whilst the lectern is being used.

The onboard memory typically comprises 128K of battery backed CMOS static RAM, with retention capability of e.g. at least one year and possibly up to ten years. The battery back-up may be by rechargeable lithium cell. This size of RAM allows for approximately 45 "pages" of 4×40 lines of text at 75% fill rate (or approximately 60 "pages" of text at 60% fill rate). A 4-hour typical presentation requires approximately 35 pages. The memory may be expanded for larger presentations.

In a further development of the present invention, the controller 9 is able to "learn" the operation commands necessary for controlling different types of external apparatus. In this case, the transmitter 20 may also act as a receiver, so that e.g. infra-red signals from a handset for controlling the external apparatus may be fed to the transmitter 20 (acting as a receiver) and from thence to the controller 9. Then, those operation commands may be triggered by suitable key strokes from the key board 32 or 40.

The transmitter 20 is preferably a 360° transmitter, to enable activation of a plurality of pieces of external apparatus positioned at different locations relative to the lectern 6. It is also possible, however, to use a directional transmitter.

If desired the lectern of this embodiment may be adapted for use with a mirror prompt screen such as is already known per se for use in speech-making from lecterns. Such a prompt screen for use with this invention, which may be raised or lowered to a desired height for the speaker in question, comprises a sheet of semi-reflective material, e.g. glass, which is supported above the lectern display at an inclined angle such that text displayed on the display is reflected off the sheet towards the person giving the speech or presentation. This allows for head-up address and may generally improve the standard and effectiveness of the speech or presentation being given. The prompt screen is preferably transparent to light travelling in a substantially horizontal plane, as is already known, so as not to obscure the speaker unduly from his/her audience and vice versa.

To allow for ready modification of a given lectern of this invention for use with such a prompt screen, the lectern preferably includes means for reversing the orientation of text displayed on the display means such that it appears in the correct orientation for the speaker or presenter when viewed in the mirror prompt screen. To accomplish this the screen of the display means may be reversible, for example by being able to be removed from its existing mounting, rotated through 180° about a transverse horizontal axis and replaced in its mounting, so that the text it then displays is upside down and so appears the correct way up when viewed by the speaker in the mirror prompt screen. Alternatively, instead of the screen itself being reversible, the electronics or software of the system may include means for automatically reversing the orientation of the text displayed on the screen of the display means.

Figure 4:
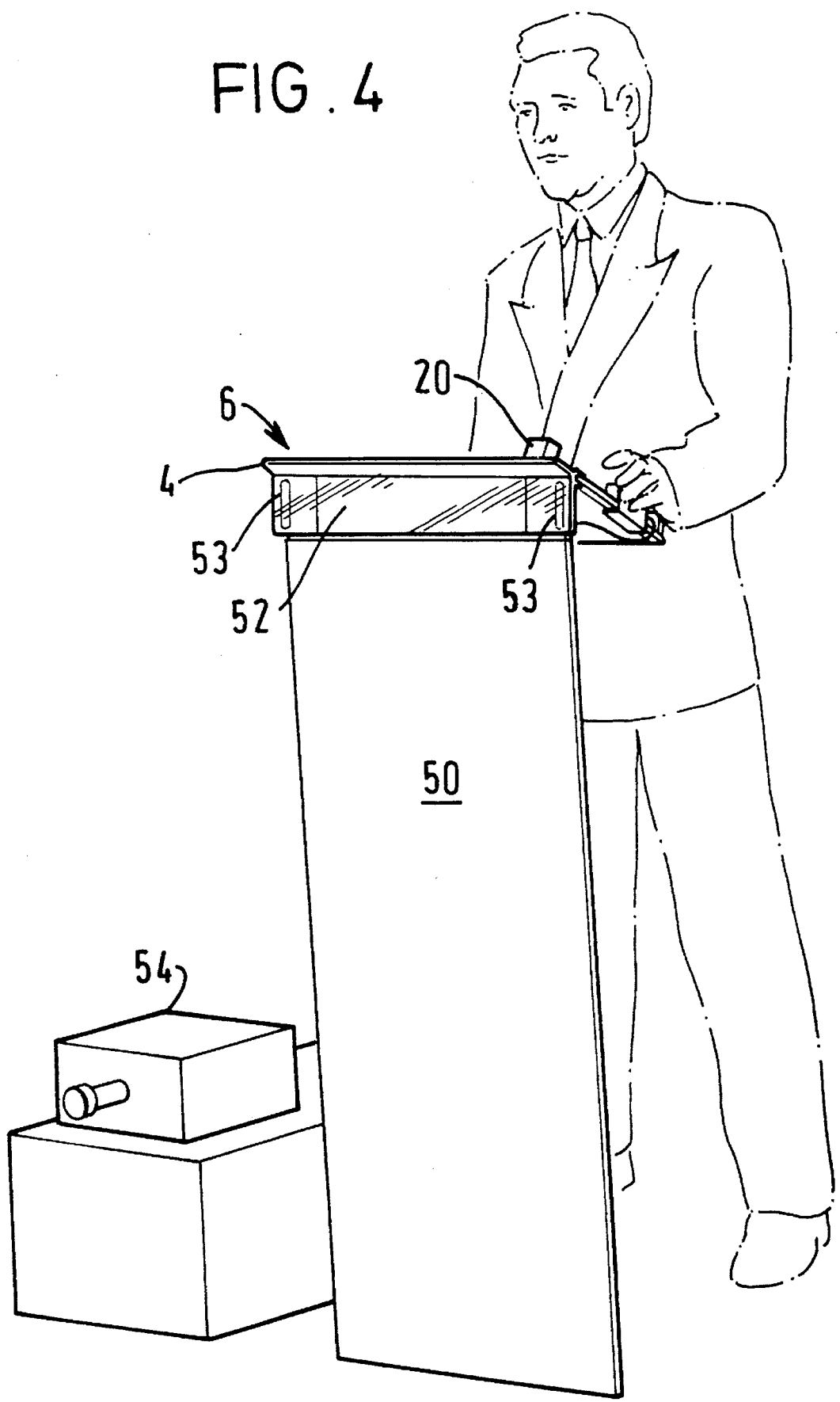
FIG. 4 shows the information display apparatus of FIGS. 1 to 3, in use as a lectern.

FIG. 4 shows a view of a lectern according to the present invention in which the panel 4 is mounted on a stand 50. The stand may be a short stand suitable, for example, for positioning on a table or podium, but FIG. 4 illustrates a larger stand 50 suitable for providing floor standing use of the lectern 6. The stand 50 may optionally include a microphone/loudspeaker system for amplifying the voice of the person giving the speech or presentation.

FIG. 4 also shows that the lectern 6 has a front panel 52 which depends from the panel 4 and has apertures 53 therein which receive corresponding projections from the stand 50, enabling the lectern 6 to be clipped to the stand 50. It is the angling of that front panel 52 relative to the panel 4 which then determines the angle θ (see FIG. 1) of inclination of the panel 4 to the horizontal. As previously mentioned, the angle θ is preferably less than 30°.

The lectern includes a foot member 60 (see FIG. 1) for resting papers etc on if necessary. There may also be included a pocket positioned on the front panel 52 of the lectern (as seen by the audience) into which a name tag or the like may be inserted.

As previously mentioned the lectern 6 also includes a transmitter 20 located, for example, on one side of the panel 4. The transmitter allows control of other types of apparatus, such as a slide projector 54, overhead projector, video projector or audio system, related to the presentation. In this embodiment the transmitter is an infra-red transmitter, e.g. one providing infra-red bidirectional communications with a range of e.g. about 10 meters. The angular range of the infra-red transmitter may be up to 360° as previously mentioned. The transmitter is arranged to send signals under control of control characters inserted into the text stored in the storage means, e.g. when the line of text containing the control character reaches the top of the screen.

Advantageously, as previously mentioned, the lectern 6 may include a clock 21 or other timing device to enable the speaker to time the speech or presentation. Such timing means may be provided at any suitable visible location on the panel 4 but is preferably adjacent the screen 2. Alternatively, timing may even be provided as an integral time display in for example a corner of the screen 2 and may be controlled by an appropriate element of the controller 9.

The above description is of only one embodiment of the present invention and variations may be made within the scope of the invention. A person skilled in the art will appreciate, for example, that other forms of control means and/or display means etc. may be used to perform the necessary tasks.

For example, a number of lecterns may be connectable to a common text source to enable a plurality of users to present the text. In such cases, other communication ports may be provided for the controller 9, e.g. an RS 485 high speed link.

Although the above embodiment has described an information display apparatus in the form of a lectern, the present invention is not limited to this and may be embodied e.g. in a display apparatus for displaying texts concerning an exhibit of a museum.

We claim:

1. An information display apparatus comprising:

a display means for the display of text;

support means for supporting said display means at a suitable height;

a storage device for storing data input thereto;

an electromagnetic radiation transmission means for transmitting operation commands in the form of electromagnetic radiation to at least one external object, a single input unit for both inputting text to said storage device and inputting said operation commands to said storage device for storage therein in conjunction with said text, and control means for both (i) controlling said text presented by said display means such that the text and the operation commands are retrieved together, the operation commands are positioned in the text, and the text, when retrieved, is displayed by said display means, and (ii) supplying said operation commands to said transmission means in conjunction with the control of said text displayed on said display means such that operation commands are automatically transmitted to said at least one external object when the text in which the commands are positioned is displayed.

2. An apparatus according to claim 1, wherein said single input unit comprises a keyboard detachably connected to said storage means.

3. An apparatus according to claim 1, wherein said single input unit comprises a computer detachably connected to said storage means.

4. An apparatus according to claim 1, wherein the control means comprises a keypad with scrolling keys for controlling scrolling of said text presented on said display means.

5. An apparatus according to claim 1, wherein said transmission means comprises an infra red transmitter.

6. An apparatus according to claim 1, wherein said apparatus comprises a lectern.

\* \* \* \* \*